Figure 1:
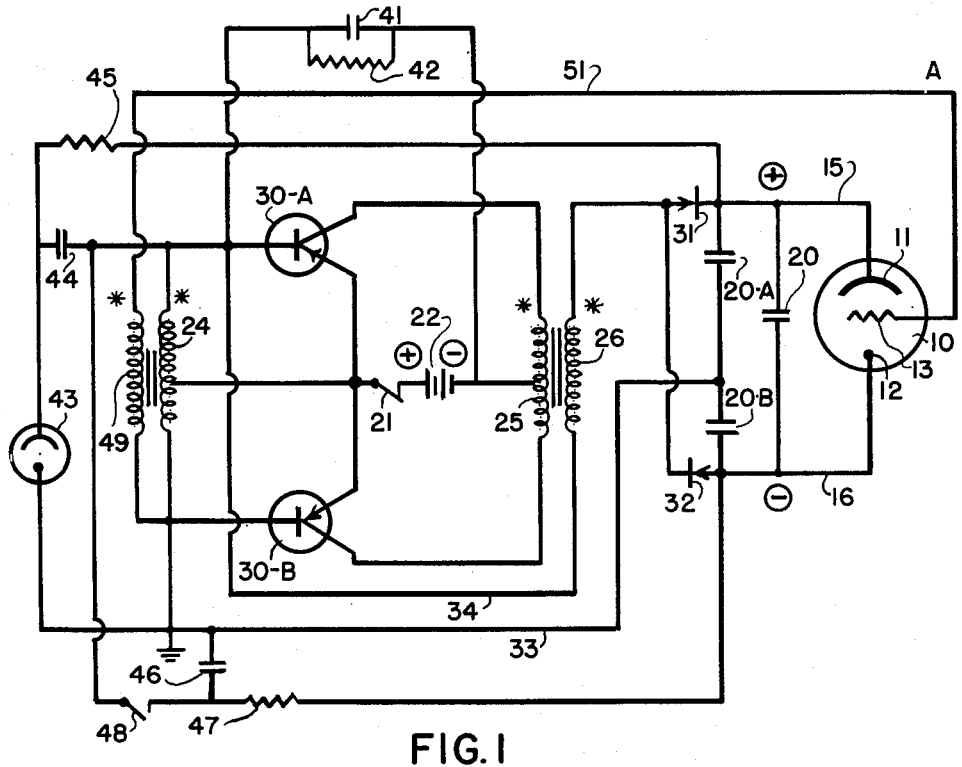

May 19, 1964 T. W. TOWNSEND 3,134,066
ELECTRIC CHARGING SYSTEMS
Filed March 4, 1959

*INVENTOR.*
T. W. Townsend by *Greene, Pineles & Durr*
ATTORNEYS

United States Patent Office 3,134,066
Patented May 19, 1964

3,134,066
ELECTRIC CHARGING SYSTEMS
Thomas W. Townsend, Bronxville, N.Y., assignor to Sonotone Corporation, Elmsford, N.Y., a corporation of New York
Filed Mar. 4, 1959, Ser. No. 797,222
5 Claims. (Cl. 320—1)

This invention relates to electric charging systems, and more particularly to electric charging systems of the type used for charging a capacitor of an electric flash tube by which a photographed object is illuminated at the moment of exposure, although the basic principles of the present invention are of broader scope.

A great many portable photographic cameras are provided with portable battery-energized flash tube equipment for producing with a repeatedly operating flash tube, high-intensity light flashes at the instant when the camera shutter makes the exposure. Known portable flash tube equipment of this type is described, for instance, in Bulletin No. 6, "Electronic Flash," 1957 revision, Form R-1618, published by The National Carbon Company, a division of Union Carbide Corporation, and in Bulletin LS-110, dated July 1954, entitled "General Electric Flashtubes—Technical Information," published by the Lamp Division of General Electric Company. In such portable battery-operated flash tube equipment, a flash capacitor is continuously charged with a rectifying vibrator charging circuit which is energized or supplied by a battery, and the charged capacitor is discharged through the flash tube when triggered by the camera shutter. Such battery-supplied capacitor charging circuits operate with at most about 50% efficiency at full load, but only with at most about 10% efficiency during continuous operation while maintaining the flash capacitor fully charged in stand-by condition to compensate for lowering of voltage due to leakage or other loss of the capacitor charge. There have also been devised transistorized charging circuits for charging the flash capacitor of battery-supplied portable flash tube equipment, and such known transistorized charging circuits likewise operate with very low efficiency during its continuous operation while maintaining the flash capacitor charged in the stand-by condition to compensate for lowering of voltage due to leakage or other loss of the capacitor charge.

Among the objects of the invention is a transistorized electric charging circuit for charging a flash capacitor of a photographic flash tube, or a similar charged device, which should be maintained at a predetermined fully charged condition, and which automatically stops its charging operation when the charged device reaches the desired fully charged condition, but is automatically restarted to resume its charging operation to keep the device fully charged when it loses a part of its charge, for instance, as a result of leakage from the charged flash capacitor.

Figure 2:
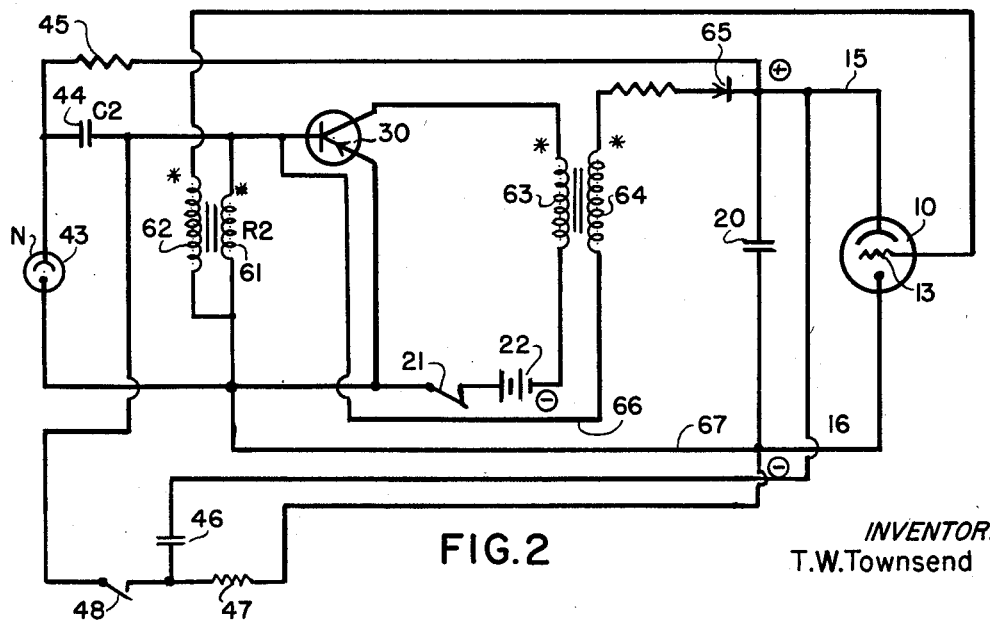

The foregoing and other objects of the invention will be best understood from the following description of exemplifications thereof, reference being had to the accompanying drawing, wherein:

FIG. 1 is a circuit diagram of one form of portable battery-supplied flash capacitor charging circuit exemplifying the invention; and FIG. 2 is a circuit diagram of another form of battery-supplied flash capacitor charging circuit exemplifying the invention.

FIG. 1 shows the circuit of one form of a portable battery-supplied electric charging circuit exemplifying the invention. It comprises a conventional electric flash tube 10 consisting of an envelope of glass or quartz which is filled with a special gas at high gas pressure and having sealed-through leads to two main interior discharge electrodes 11 and 12 between which an electric discharge passes when a triggering impulse is supplied through the sealed-through lead of trigger electrode 13. A main or flash capacitor 20, which is maintained in the desired charged condition, is connected to the two flash tube discharge electrodes 11 and 12 through two opposite-polarity conductor leads 15, 16, which are marked by (+) and (—) symbols. Electric energy for supplying the electric charge to the flash capacitor 20 is supplied by a direct-current supply source of relatively low voltage shown as consisting of a battery 22 having opposite plus and minus poles indicated by (+) and (—) symbols. By way of example, the battery 22 may have only a relatively low supply voltage, for instance 12 volts; the flash capacitor 20 may have a capacity of 1150 microfarads, and is to be maintained fully charged at a direct-current voltage of 480 volts; and the flash tube 10 may be triggered to discharge therethrough the capacitor charge when a trigger pulse that reaches a peak of about 15 kilovolts in one micro-second, is applied to trigger electrode 13 of the flash tube.

The present invention provides a charging circuit which transforms the low voltage energy of the direct-current source, such as battery 22, into the desired high voltage charging current which charges the flash capacitor 20 until it is fully charged to the desired high voltage. The charging circuit is arranged to sense the charge or change in the charge condition of the flash capacitor and to operate in response thereto, to automatically stop the charging operation when the flash capacitor is fully charged and to automatically resume the charging operation when it senses a loss of the capacitor charge due to leakage or otherwise.

In accordance with a phase of the invention, a transistor oscillator which is supplied by the direct-current source is utilized as a sensing means which is sensitive to the charge or a change in the charge condition of the flash capacitor, and to start the charging operation or close the charging circuit when the capacitor charge is below the desired predetermined level, and to cause the charging circuit to continue the charging operation until the sensing oscillator senses that the charge of the flash capacitor has reached or is at the desired high level, whereupon it opens the charging circuit or stops its operation. Further in accordance with a phase of the invention, a transistor oscillator which is connected to the low voltage direct-current source, is utilized to generate electric oscillations and thereby supplies an oscillating current of sufficient energy to provide a rectified direct current of a voltage high enough to charge the flash capacitor with the desired charge at the desired predetermined high flashing voltage required for supplying to the flash tube the desired flashing energy.

Further in accordance with a phase of the invention, a transistor oscillator circuit which is connected to the low voltage direct-current source, is arranged to sense the charge condition or a change in the charge condition of the flash capacitor and to start oscillations and also supply rectified oscillating current of a sufficient energy for charging the capacitor and continue charging the capacitor whenever and/or as long as it senses that the charge of the flash capacitor is below and has not reached the predetermined charge level, and to stop the oscillations and discontinue supplying the direct-current charging current in response to oscillator circuit sensing that the flash capacitor is fully charged, and also to re-start the oscillator in response to sensing that the capacitor charge has dropped below the desired predetermined high level thereof.

One form of charging circuit exemplifying the invention will now be described in connection with FIG. 1.

It comprises two transistors 30-A, 30-B, which are connected back-to-back to provide push-pull amplification between an input circuit 24 and an output circuit 25. Although they may be of other types, the two transistors 30-A, 30-B are assumed to be conventional junction transistors and they are shown as PNP transistors, and are both connected in common-emitter configuration. However, the circuit shown may operate with junction transistors of opposite conductivity, in which case the direct-current source will have reversed polarity. The two bases of the two transistors 30-A, 30-B are connected respectively to the opposite ends of an input circuit winding 24 which is shown interlinked with a ferromagnetic core. The output circuit 25 consists of the primary winding of an output transformer which is interlinked through a ferromagnetic core with the secondary transformer output winding 26. The collectors of the two transistors 30-A, 30-B are connected in push-pull to the end terminals of the primary transformer winding 25. The emitters of the two transistors 30-A, 30-B are connected in push-pull through a common emitter lead to the positive terminal of the direct-current source, the negative terminal of which is connected in push-pull to an intermediate or mid-point of the transformer output winding 25, thereby completing the push-pull emitter-collector circuits of the two transistors 30-A, 30-B. The push-pull input circuit to the two transistors 30-A, 30-B is completed by connecting the intermediate or midpoint of the input impedance or input circuit coil 24 to lead which connects the emitters of the two transistors in push-pull to the positive pole of the direct-current source 22. A main energizing switch 21 serves to disconnect the battery 22 whenever the flash equipment is put away, and to connect the battery 22 to its circuits whenever the flash equipment is to remain in stand-by condition and supply electric energy to the flash tube 10 each time a photographic exposure is to be made.

The two transistors 30-A, 30-B and the circuit including the direct-current source 22 and the output transformer windings 25, 26 and input circuit portion 24, form part of a feedback oscillating circuit which generates electric oscillations or oscillation pulses and delivers them through output transformer winding 26. The just-described oscillating circuit is provided with a feedback circuit connection through which a sufficiently large and properly phased component of the oscillating signal output is fed back in push-pull to the input transistor electrodes or bases of the two transistors 30-A, 30-B for causing the oscillating circuit to maintain its oscillations and deliver them to the transformer output secondary winding 26 as long as the proper component of the output current is fed back in push-pull to the input side of the two transistors. In FIG. 1, the output circuit includes two oppositely poled rectifying means which consist of semi-conductor diodes 31, 32 connected with their respective proper poles to one end of the secondary transformer output winding 26, and connected with their other poles to the opposite-polarity terminal leads 15, 16 of the charged device or capacitor 20 for rectifying the opposite half-cycle oscillating pulses delivered by the secondary transformer winding 26 and supplying rectified direct-current pulses or charging currents of proper polarity to the positive and negative terminals of the charged capacitor 20. To double the rectified output voltage, two voltage-doubling capacitors 20-A, 20-B are connected between the opposite-polarity direct-current leads 15, 16 of the charged capacitor 20 and the diode terminals connected thereto. The output circuit of the secondary transformer winding 26 includes positive feedback lead connection 33 from the intermediate or midpoint connection between the two voltage-doubling capacitors 20-A, 20-B to one side of the input circuit portion 24 which is connected to push-pull transistor 30-A. The output circuit is completed by another feedback lead 34 connecting the other end of the secondary transformer output winding 26 to the opposite side of the input circuit portion 24 which is connected to the other push-pull transistor 30-B. The voltage-doubling capacitors 20-A, 20-B may have sufficiently large capacity so that they provide in themselves capacitor means of the same capacity as the main flash capacitor 20 described above, in which case they themselves operate as the main flash capacitor without the need of the flash capacitor 20 shown. Instead of using a winding as the input circuit portion 24 of FIG. 1, a non-inductive ohmic resistance may be used as the input circuit portion 24. In FIG. 1, input circuit winding 24 is a transformer winding which is ferromagnetically interlinked with an impulse winding 49 through which a trigger pulse is supplied to trigger electrode 13 of flash tube 10, as described hereinafter.

For the purpose of describing the operation of this circuit, it is assumed that a current impulse through transformer winding 25 of FIG. 1 which makes its upper end which is marked with a star, positive, will induce in the associated transformer windings a current pulse which makes positive the end thereof which is marked with a star, and that the stars applied to the ends of the other pair of associated transformer windings 24, 49, designate their corresponding characteristics. It is further assumed that each of the amplifier circuits of each of the two push-pull transistors 30-A, 30-B, amplifies the input signal delivered to its respective input electrodes and provides a positive feedback amplifying action which covers all circuit losses as well as the energy supplied to the load, and has an amplifier gain of at least unity which is sufficient to sustain oscillations in each half of the push-pull circuit.

It is now assumed that the charge level of the charged device or flash capacitor 20 is below its desired fully charged level or peak voltage, and that the direct-current source 22 starts sending current, for instance, by way of emitter and collector of upper transistor 30-A through the upper half of primary transistor winding 25, making the upper starred end of this primary winding 25 more positive than its mid-point. This primary current induces in its secondary transformer winding 26 a current which makes its upper starred end positive relative to its lower end. A part of the so-started and directed current through secondary transformer winding 26 flows through a circuit including feedback lead connection 34 from the base of upper transistor 30-A through secondary transformer winding 26 and the connection of its upper positive end through diode 31, upper capacitor 20-A and feedback lead 33, to the lower end of input circuit portion 24, or base of the opposite transistor 30-B, thereby driving the base of upper transistor 30-A negative, and thereby increasing the emitter-collector current which makes the upper starred ends of its primary transformer winding 25 more positive, thereby increasing the induced current in the secondary transformer winding 26 that is more positive at its upper starred end, which current is similarly fed back and further increases the negative bias drive of the base of transistor 30-A until this feedback action increases the current in the emitter-collector circuit of upper transistor 30-A to a maximum saturation level beyond which it cannot increase. Since the ferromagnetic core of the primary and secondary transformer windings 25, 26 is magnetized to a maximum when saturation current flows through its windings, the magnetization of the ferromagnetic core starts decreasing at the moment after, in the just-described half-cycle current through its windings, it becomes saturated and stops increasing. As the magnetization of the core starts decreasing, it induces an oppositely-directed voltage in the secondary transformer winding 26, reversing the bias applied to the bases of the two transistors 30-A, 30-B, with the negative bias now being applied to the base of the opposite push-pull transistor 30-B and causing it to start carrying current in its emitter-collector circuit from the positive terminal of direct-current source 22 in opposite or reversed direction through the lower half of primary transformer winding 25. This oppositely-directed current in the lower half of primary transformer winding 25 induces a corresponding oppositely-directed secondary current pulse in the circuit of secondary transformer winding 26, which passes through oppositely-poled diode 32 and capacitor 20–B, and is fed back in an analogous way to the input circuit so as to drive with negative bias the base of transistor 30–B, thereby increasing by similar feedback action the emitter-collector current of transistor 30–B until the opposite oscillatory current pulse reaches a maximum saturation, at which time-point the conditions again reverse, thereby starting the next half-cycle of continuously generated oscillations, the opposite half-cycle pulses of which are rectified in circuits of secondary transformer winding 26 for continuously charging the two serially-connected capacitors 20–A, 20–B, and therethrough the main charging capacitor 20.

The charging operation just described continues until a time-point is reached at which the capacitors 20–A, 20–B, and capacitor 20, are charged to the maximum level or to peak value of the direct voltage impressed by the secondary transformer winding 26 on the flash capacitor 20 and the two capacitors 20–A, 20–B. At the moment the flash capacitor 20 is fully charged, the two diodes 31, 32 stop carrying current and they open the feedback circuit from the secondary transformer winding 26 to the input side of the two push-pull transistors 30–A, 30–B, thereby stopping their respective base currents and causing their respective emitter-collector currents to drop to the minute residual value and thereby stopping further the oscillations in the push-pull circuits of the two transistors 30–A, 30–B.

FIG. 1 shows also, by way of example, a flashing circuit whereby a trigger flash impulse—which reaches in one micro-second the desired high peak trigger voltage, for instance, of about 15 kilo-volts—is applied to the trigger electrode 13 of the flash tube 10. An auxiliary capacitor 46 and serially connected auxiliary charging resistance 47 are connected between the ground lead 33 from the two serially-connected charge capacitors 20–A, 20–B and the negative lead 16 of the charged capacitors. The auxiliary capacitor 46 is arranged to be discharged by a shutter switch 48 which is suitably interlinked with the operation of the camera shutter so as to close a discharge circuit for the auxiliary capacitor 46 at a moment properly synchronized with the camera exposure. The auxiliary capacitor 46 of this charging circuit is arranged to be charged at a sufficiently high charge voltage so that when the shutter switch 48 is closed, the charge will be discharged through the input circuit winding 24 of the transistor oscillating circuit and thereby induce in a ferromagnetically coupled secondary winding 49 thereof a high-voltage current pulse which is applied through a trigger lead 51 thereof to the trigger electrode 13 of the flash tube 10 for thereby triggering the flash tube 10 to discharge the direct-current charge of flash capacitor 20 and/or the flash capacitors 20–A, 20–B. The trigger pulse which is sent by closure of shutter switch 48 through the secondary pulse winding 41, drives the trigger electrode 13 of the flash tube positive, with a very high peak voltage which is positive with respect to the main discharge electrodes 11, 12 of the flash tube 10, and thereby triggers the flash tube to discharge the charge of the flash capacitors 20, 20–A, 20–B between the main electrodes 11, 12.

In accordance with the invention, the very same electric trigger pulse which is applied for producing the capacitor discharge through flash tube 10, is utilized to apply trigger action to the oscillator circuit for initiating and restarting its oscillations at the instant the trigger pulse causes the flash capacitors 20, 20–A, 20–B to discharge their energy through flash tube 10. Further in accordance with the invention, a part of the energy of trigger pulse which is applied to flash tube 10 for discharging therethrough the charged flash capacitor, is also applied to a transistor or to the input electrode of a transistor of the oscillator circuit for again initiating its oscillations and cause it to oscillate and thereby charge the flash capacitor 20 until it is charged to its peak voltage.

When the camera shutter switch 48 closes (as seen in FIG. 1), the lower side of auxiliary trigger capacitor 46 of the trigger circuit is negatively charged through resistor 47 for triggering the flash tube 10, this shutter switch 48 also connecting the negatively charged side of trigger capacitor 46 to the base of transistor 30–A, thereby causing it to increase its emitter-collector current and thereby again initiate sustained oscillations, as described above in connection with the base of push-pull transistor 30–A.

The desired triggering of the oscillator circuit by the flash tube trigger action, may also be secured in another way. As shown in FIG. 1, the bases of the two push-pull transistors 30–A, 30–B are connected to the opposite ends of the low-voltage input winding 24, which is ferromagnetically coupled to the trigger pulse winding 49. When a trigger pulse is sent in any way through the trigger winding 49, a corresponding current pulse is produced in its ferromagnetically coupled input circuit winding 24, which is connected to apply this current pulse between the bases of the two push-pull transistors 30–A, 30–B. One half of the trigger-action voltage pulse so induced in one half of input circuit winding 24 will be applied with proper polarity to the base of one of the two push-pull transistors, and drive it negative for starting an increase of its emitter-collector current and thereby initiating sustained oscillations, as described above. These sustained oscillations are thus initiated at the moment when the trigger impulse applied to trigger electrode 13 of flash tube 10 starts the discharge of the photoflash capacitor 20 through flash tube 10.

In accordance with a further phase of the invention, if the charge of flash capacitor 20 with its associated capacitors 20–A, 20–B is discharged through the flash tube 10, any disturbance in the emitter-collector circuit of any of the two push-pull connected transistors 30–A, 30–B will re-start a flow of current through the emitter-collector circuit of one of the two transistors, thereby restarting the feedback action described above whereby sustained pulse oscillations are again set up in their oscillator circuits, whereby the two voltage-dividing capacitors 20–A, 20–B and the main flash capacitor 20 are again fully charged. Such oscillation-starting disturbance in a transistor circuit may be produced by an action which connects the battery to the transistor circuit, for instance by closing the battery switch after first momentary opening thereof, if the normal thermal activity in the semi-conductor body portions of the circuit transistor is sufficient to start a trickle current through its emitter-collector circuit, whereby sustained oscillations are initiated in the same manner as described above.

In accordance with the invention, to assure flow of such oscillation-starting trickle current upon closure of the battery circuit, an auxiliary capacitor is connected to the transistor circuit in such manner that on the closure of the battery circuit, a charging current will flow through the transistor whereby its input side will be driven to cause flow of an initial small current through the collector circuit whereby sustained oscillations are initiated in the way described hereinbefore. In FIG. 1, the auxiliary capacitor is connected between the base of 30–A and a terminal of the battery 22 so that on connecting the battery to the transistor 30–A, as by closure of switch 21, a charging current will flow through capacitor 41 and the base-emitter circuit of transistor 30–A, which will drive its base negative, thereby initiating emitter-collector current flow which initiates the sustained oscillations in the manner previously described. An auxiliary resistance 42 is connected in shunt to auxiliary capacitor 41 to assure that it is fully discharged after a short period or a few seconds, such as two to three seconds, if the battery circuit is opened. This makes certain that when the battery circuit is closed, as by switch 21, the charge of the auxiliary capacitor 41 will be zero at the instant when the battery switch closes, thereby assuring the flow of trickle current through capacitor 41, which drives the base of transistor 30–A and thereby initiates sustained oscillations.

With the auxiliary capacitor 41 fully discharged and its voltage being zero at the instant of the closure of the battery circuit, the full battery voltage is applied between the base of transistor 30–A and its emitter. The constants of the circuit associated with auxiliary capacitory 41, transistor 30–A and battery 22, are so chosen that on closure of the battery circuit, the full battery voltage is applied by capacitor 41 between the base and collector of transistor 30–A only for a fraction of a milli-second as a pulse of minute duration which is nevertheless sufficient to initiate oscillations in the push-pull oscillator circuit described above. Once oscillations have been started, the auxiliary capacitor 41 and its associated shunting resistance 42 do not in any way affect the operation of the oscillator as it operates to recharge the flash capacitors 20, 20–A, 20–B after each of a succession of flash-discharges through flash tube 10, until the equipment is actually shut off entirely by positively retaining switch 21 in its open position. As long as the oscillations continue in the push-pull transistor oscillating circuit described above, the voltage across auxiliary capacitor 41 consists of a direct-current component equal to the battery voltage plus an alternating-current component equal to the base-emitter voltage of transistor 30–A. Although a minute current will flow continuously through shunting resistance 42 of the auxiliary capacitor 41 which is connected in the circuit, the shunting resistance 42 can be given such high value, for instance 1 megohm, to make the current therethrough negligible while assuring that it will discharge completely the auxiliary capacitor 41 within the desired short period.

In practice, the fully charged flash capacitor 20, if left for a long time in stand-by condition, begins to lose some of the direct-current charge due to leakage, thereby lowering the direct-current voltage level of the flash capacitor 20. Although the flash capacitor could be kept fully charged by connecting a current or voltage feedback loop from the circuit portion of the flash capacitor 20, such as one of its leads 15, 16, to the input side of the push-pull oscillating circuit, maintenance of continuous oscillation during stand-by condition, wastes energy of the supply source, such as battery 22. Furthermore, continuous oscillations would require a portable photoflash equipment having either a very heavy, large supply battery 22, or the user would be limited to a short period of use of the equipment, unless he disconnects the battery 22 by bringing the manually operated stand-by switch to the open position each time he stops making exposures and keeps the equipment in stand-by condition, which would require closure of the stand-by switch when he is about to make further exposures. However, such stand-by battery switch may cause trouble because of the user forgetting to open the stand-by switch at the beginning of the stand-by period, or forgetting to close the stand-by switch before starting further photoflash exposures.

FIG. 1 shows, by way of example, one automatic arrangement whereby a charging circuit of the invention may be equipped with charge-sensing means for assuring that when the flash capacitor loses a portion of its charge, for instance, due to leak, the flash capacitor will be automatically fully charged to peak voltage without keeping the transistor oscillating circuit continuously oscillating during the stand-by period. The charge-sensing means have a sensing circuit which comprises a relaxation oscillator consisting of an auxiliary gaseous discharge tube or device, such as a neon glow tube 43, connected in series with an ouxiliary capacitor 44 across a portion of the input circuit of one or both of transistors 30–A, 30–B. The auxiliary discharge tube 43 and capacitor 44 are connected between the base of transistor 30–A and the lead connection 33 from between the two auxiliary charged capacitors 20–A, 20–B, which lead 33 is marked with the ground symbol and may be considered as the ground lead. The auxiliary capacitor 44 is connected through an auxiliary charging resistance 45 to a circuit portion of the charged capacitor 20 of the charged capacitors 20–A, 20–B, for causing a relatively minute part of its charge to charge auxiliary capacitor 44 until its charge reaches a direct-current voltage level which causes it to discharge or fire a stand-by discharge or pulse through the discharge tube 43 and through the input circuit portion 24 of the transistor oscillating circuit to which it is connected.

The constants of the auxiliary capacitor 44 and its charging resistance 45 of the charge-sensing means are so chosen as to cause the auxiliary discharge tube 43 to have discharged therethrough a stand-by discharge or pulse at periodic intervals, for instance, every two or three, or five, seconds. The stand-by discharges or pulses through auxiliary discharge tube 43 apply a pulse voltage which will start oscillations if the charge or voltage of the flash capacitor 20 and its associated capacitors 20–A, 20–B is below the full or peak charge level or a few volts below peak voltage. In the idling state, while the flash capacitor 20 is at its peak voltage, the discharge pulses of the auxiliary discharge tube 43, though amplified by the transistor push-pull oscillator circuit, will not cause the oscillator circuit to oscillate and deliver charging current to the flash capacitor 20, because the rectifying diodes 31, 32 are not conductive and they will keep open the feedback loop of feedback conductors 33, 34 through which alternating oscillatory pulses are fed back by transformer secondary winding 26 to the input side of the push-pull amplifier for initiating oscillations and sustaining them. However, when through leakage, the peak voltage across the flash capacitor 20 has dropped a few volts to a somewhat lower level at which an amplified stand-by pulse which is induced in the secondary transformer winding 26 will be fed back through rectifying diode 31 to the input side of the two push-pull transistors 30–A, 30–B in proper phase and magnitude to produce an over-all amplification equal to at least unity, such stand-by pulse through auxiliary discharge tube 43 will initiate sustained oscillations of the oscillating circuit as described above, and cause it to continue to oscillate until the flash capacitor 20 has again been fully charged.

Summarizing, the constants of the stand-by pulse circuit consisting of discharge tube 43, auxiliary capacitor 44 and auxiliary charge resistance 45, are so chosen that the auxiliary discharge tube 43 is fired or discharged at periodic intervals, for instance, every two or three or five seconds, for producing periodic stand-by current pulses. Such stand-by current pulse is effective in starting oscillations of the push-pull feedback amplifier circuit of transistors 30–A, 30–B, if through leakage, or otherwise, the charge of flash capacitor 20 has dropped a few volts below its peak voltage, at which the diodes 31, 32 will rectify amlpified oscillator signals and complete the feedback circuit from secondary transformer winding 26 to the input side of the push-pull connected transistors 30–A, 30–B. Under such conditions, a discharge of auxiliary capacitor 44 through auxiliary tube 43 of the stand-by pulse circuit of the charge-sensing means will momentarily drive the base of the upper transistors 30–A negative with respect to its emitter, thereby starting an increase of current through its emitter-collector circuit and initiating sustained oscillation of the push-pull oscillating circuit and the charging flash capacitor 20 which continue until the rectifying diodes 31, 32 stop carrying rectifier current pulses and thereby stop the oscillations when the charge of the flash capacitor 20 has again reached peak voltage.

A feature of the invention is the fact that auxiliary discharge tube 43 is a neon light, and that the periodic discharges therethrough in the standby condition indicate that the equipment is in the "ready" condition.

Without thereby limiting the scope of the invention, but only to enable more ready practice thereof, there are given below, representative data of one commercial form of charging equipment of the invention of the type described in connection with FIG. 1.

The capacity of flash capacitor 20 is 1150 microfarads.
  The capacity of each of the voltage-doubling capacitors 20–A, 20–B is 12 microfarads.
The output transformer windings 25, 26 are designed to charge each of the two charged capacitors 20–A, 20–B to a peak direct-current voltage of 240 volts, and the main charged capacitor, to a peak direct-current voltage of 480 volts.
Transistors 30–A, 30–B, may be type 2N–307 Sylvania or type 2N–285A Bendix.
Rectifying diodes 31, 32 may be type M–500.
Direct-current source 22 consists of ten Sonotone nickel-cadmium battery cells type D, with a voltage of 12 volts.
The capacity of each capacitor 20–A, 20–B is 12 microfarads.
Auxiliary discharge tube 43 is a neon discharge bulb, type NE–2.
The capacity of auxiliary capacitors 44 is .047 microfarad; the capacity of auxiliary capacitor 46 is .47 microfarad; and resistance 47 is 1.2 megohms.
The auxiliary resistance 45 is 66 megohms.

After the flash capacitor 20 has been discharged through flash tube 10, it will be fully recharged within about twenty seconds. The maximum battery current after discharge of the flash capacitor is about 5 amperes (with an ampere-meter of 1 ohm resistance in series). While idling in stand-by condition, the circuit of auxiliary tube 43 draws a current at each discharge thereof which is equivalent to a steady current of about 5 milliamperes, or in general, less than 10 milliamperes.

Although for best efficiency, it is desirable that the oscillator of a charging arrangement of the type described above should operate with a push-pull transistor amplifier circuit, the principles of the invention are not limited to a charging arrangement operating with push-pull transistor oscillator circuits. FIG. 2 shows, by way of example, one form of portable battery-supplied flash capacitor circuit of the invention which operates with a single-transistor oscillating circuit. The circuit of FIG. 2 corresponds to that of FIG. 1, except that the push-pull oscillator circuit thereof is modified into a single-transistor oscillator circuit. The circuit of FIG. 2 has a flash tube 10 and a charging capacitor 20 connected through leads 15, 16 to the electrodes of the flash tube 10. A junction transistor 30, shown as a PNP transistor, is part of a circuit which is connected to the direct-current source or battery 22, to provide therewith an oscillator circuit the oscillations of which are rectified for supplying rectified direct current for charging the flash capacitor 20 to a predetermined peak voltage required for producing the desired flash discharge through flash tube 10.

In FIG. 2, the oscillator circuit of transistor 30 comprises an input circuit 61 connected between the base and emitter of transistor 30, and an output circuit 63 connected between the collector and emitter thereof. Although the input circuit 61 of transistor 30 may consist of a resistance, it is shown as a transformer winding which is interlinked through a ferromagnetic core to an input winding 62 corresponding to the impulse winding 49 of FIG. 1. The output circuit 63 consists of the primary winding of an output transformer having a ferromagnetic core through which it is coupled to its secondary transformer winding 64. The primary output transformer winding 63 is connected between the emitter of transistor 30 and the negative terminal of the direct-current battery 22, its positive terminal being connected through a main energizing switch 21 to the emitter of transistor 30. The circuits including the transistor 30, the direct-current source 22, the output transformer windings 25, 26 and the input circuit 31, form a feedback oscillating circuit which generates sustained electric oscillations or oscillation pulses and delivers them through secondary output transformer winding 64 to the output circuit.

In FIG. 2, the output circuit is shown as including rectifying means which may consist of semi-conductor diode 65, which rectifies the oscillation output of transformer secondary winding 64, and impresses the rectified current pulses to flash capacitor 20 for charging it to the required peak voltage. The output circuit of transformer secondary winding 64 is completed by feedback lead 66 from one end of the secondary transformer winding 64 to the side of the input circuit which is connected to the base of transistor 30, and by feedback lead 67 which connects the negative side of flash capacitor 20 to the side of the input circuit 61 which is connected to the emitter of transistor 30.

The constants of the different elements of the just-described oscillating circuit including transistor 30 and direct-current source 22, are so chosen as to cause the transistor 30 to amplify alternating input current pulses or signals impressed thereon and feedback through the feedback path of the secondary transformer winding 64 to the input side of transistor 30, with a sufficiently large component of the output which is in phase with the input signals so as to cause the just-described oscillating circuit to maintain sustained electric oscillations and deliver them to the output circuit through the secondary transformer output winding 64 as long as such proper component of the output is fed back to the input side of transistor 30.

For the purpose of describing the operation of the oscillator circuit of FIG. 2, it is assumed that the amplifier circuit of transistor 30 amplifies the input signals delivered to its input electrodes with a feedback amplifying action which covers all circuit losses as well as the energy supplied to flash capacitor 20, and that it has an amplifier gain of at least unity which is sufficient to maintain sustained oscillations in its circuits. Assuming that—with the flash capacitor 20 discharged—the battery 22 is connected to the circuit as by closure of switch 21 and a small current starts flowing from the direct-current source 22 through the emitter-collector electrodes of transistor 30 to the primary transformer winding 63, which makes the upper starred end thereof positive relatively to its lower end and induces in its secondary transformer winding 64 a current which makes its upper starred end positive relatively to its lower end. A part of the so-started and directed current in the circuit of secondary transformer winding 64 flows through a circuit including the diode 65, the flash capacitor 20 and the two feedback leads 66, 67, to the input side of transistor 30, which direct-current serves to charge flash capacitor 20. This fed-back direct current is of such polarity as to drive the base of transistor 30 negative, thereby further increasing its emitter-collector direct current through the primary transformer winding 63, which is similarly fed back to the input side thereof until this feedback action increases this emitter-collector current through primary transformer winding 63 to a maximum saturation level beyond which it cannot increase.

As the magnetization or field flux of the ferromagnetic core transformer windings 63, 64 has reached a maximum by the just-described rise of the emitter-collector current therethrough to maximum saturaton level, the magnetization of the ferromagnetic cores starts decreasing, thereby inducing an oppositely-directed current pulse in the secondary transformer winding 64 and its circuit including the flash capacitor 30 and the feedback leads 66, 67 which connect it to the base and emitter of transistor 30. This reversed current pulse through the circuit of transformer secondary winding 64 applies to the base of transistor 30 a bias which decreases the emitter-collector current from battery 22 and thereby increasing the just-described reversed current pulse through the transformer secondary winding 64. The just-described reversed current pulse through the circuit of transformer secondary winding 64 and the serially-connected flash capacitor 20, correspond to the first current pulse of a series of decaying opposite oscillator current pulses that would be discharged through such circuit by the decaying magnetic field of the ferromagnetic core associated with the transformer secondary winding 64. The first of these decaying opposite current pulses is followed by a second current pulse having a polarity which applies again a negative bias to the base of transistor 30, thereby again increasing the flow of another emitter-collector direct-current pulse through transistor 30–A and primary transformer winding 63, which makes its upper starter end positive and charges the capacitor 20. The circuit of the secondary transformer winding 64 including the serially-connected flash capacitor 20, is designed to include sufficient series resistance, indicated in FIG. 2 by a resistance in series with diode 65, as to cause the decaying opposite current pulses—induced therein by the previously-described decay of the field flux of the transformer core—to substantially terminate with the second current pulse of the decaying opposite pulses, whereby the negative bias is again applied thereby to base of transistor 30 and causes it to pass another emitter-collector current pulse which makes positive the starred upper end of transformer winding 63, thereby starting the second cycle of sustained feedback oscillations, one half-cycle of which serves to charge the flash capacitor 20, in a manner analogous to the previously-described first cycle of current pulses, in the first half-cycle of which the flash-capacitor 20 was being charged.

The just-described sustained oscillations in the circuit fo transistor 30 develop an alternating-current voltage across its secondary transformer output winding 64, and the major half-cycle pulse of this alternating-current voltage is rectified by rectifier diode 65 for thereby gradually charging the flash capacitor 20 until it is charged to its desired peak voltage corresponding to the peak voltage applied thereto by the circuit of the secondary transformer winding 64. The constants of the oscillator circuit associated with transistor 30 are so chosen that the alternating-current component of the oscillation cycles in the oscillating circuit thereof is fed back to the input side thereof with sufficient gain to cover all losses and charging energy for the capacitor and provide a feedback gain of at least unity. As the flash capacitor 20 is being charged and increases its charge voltage, a gradually diminishing pulsating negative direct-current voltage is applied to the input side of the transistor 30 between the base and emitter thereof, causing the base to be subjected to progressively smaller surges of the negative bias applied thereto. The charging of the flash capacitor 20 continues until it is charged to its peak voltage corresponding to the maximum voltage applied thereto by the charging circuit. At the moment the flash capacitor 20 is fully charged, the rectifying diode 65 stops carrying current and opens the feedback circuit from the secondary transformer winding 64 to the input side of transistor 30, thereby stopping the base current and causing the emitter-collector current to drop to a very small value and stopping the sustained oscillations.

As in the case of the oscillator circuit of FIG. 1, after the flash capacitor 20 is discharged through flash tube 10, any disturbance in the emitter-collector circuit of transistor 30 will initiate an increase in the emitter-collector current which is increased by the feedback action until sustained feedback oscillations are again initiated for again charging by rectified oscillation pulses the flash capacitor 20 and continuing the oscillations and the capacitor-charging operation until it is again charged to peak voltage, in a manner analogous to that described in connection with FIG. 1. Such oscillation-initiating disturbance in the oscillator circuit of transistor 30 may be produced by an action which connects the direct-current battery 22 to the circuit, for instance, by a momentary closure of previously opened switch 21, in a manner analogous to the corresponding oscillating-initiating action described above in connection with FIG. 1.

The initiation of oscillations in the charging circuit of flash capacitor 20 may also be secured by an auxiliary stand-by pulsing circuit consisting of auxiliary discharge tube 43, auxiliary capacitor 44 connected across the input circuit portion 61, and a charging resistance 45 connecting the auxiliary capacitor 44 to the positive side of flash capacitor 20 for providing periodic oscillation-initiating pulses for the oscillator circuit operating with transistor 30 of FIG. 2, in the manner done by the corresponding stand-by pulsing circuit elements 43, 44 and 45 of the circuit of FIG. 1.

The charging circuit of FIG. 2 may also be provided with triggering means for triggering the flash tube 10 for discharging therethrough the charge of capacitor 20. The flash trigger circuit of FIG. 2 is similar to that of FIG. 1. It comprises an auxiliary trigger capacitor 46 connected in series with charging resistance 47 across the flash capacitor 20 for charging auxiliary capacitor 46 with an auxiliary charge in a manner analogous to corresponding elements 46, 47 of FIG. 1. The primary input winding 61 is ferromagnetically coupled to a step-up pulse transformer winding 62 which is connected between the grounded or emitter side of input winding 61 and the trigger electrode 13 of flash tube 10, in a manner analogous to the input winding 49 of the circuit of FIG. 1. The auxiliary trigger capacitor 46 is arranged to be discharged by a shutter switch 48 operating in synchronism with the camera shutter to close its switch contacts in synchronized relation to the camera exposure. On closure of the shutter switch 48, the charge of trigger capacitor 46 is discharged through the primary winding 61 of the trigger secondary transformer winding 62 for inducing therein a high-voltage trigger pulse which is applied to trigger electrode 13 of flash tube 10 to discharge therethrough the direct-current charge of flash capacitor 20 and produce the desired light flash. The trigger pulse which is applied for discharging the flash capacitor 20 through flash tube 10, is also utilized to trigger the oscillator circuit of transistor 30 for initiating its sustained oscillations and the recharging of flash capactor 20 at the instant that it has been discharged through flash tube 10. Closure of the shutter switch 48 of FIG. 2 connects the negatively charged side of the trigger capacitor 46 to the base of transistor 30, thereby causing it to increase its emitter-collector current flow from the battery 22 and thereby again initiate sustained oscillations for fully recharging flash capacitor 20, in the manner described above in connection with this figure.

Without thereby limiting the scope of the invention, there are given below data of an operating sample of a charging equipment of the invention of the type described in connection with FIG. 2.

Capacity of flash capacitor 20 is 1150 microfarads. Output transformer windings 63, 64 are designed to charge the flash capacitor 20 to a peak voltage of 280 volts.

Junction transistor 30, rectifier junction diode 65 and battery 22, are the same as in the device of FIG. 1.

Instead of input windings 61, shown in FIG. 2, the sample charge equipment operated with an input resistance of 600 ohms connected between the base and emitter of transistor 30. (The oscillator circuit of the device of FIG. 1 will likewise operate in the manner there described if an input resistance of 1200 ohms is connected between the bases of the two push-pull-connected transistors 30–A, 30–B, with the mid-point of the input resistance connected to the emitters of the two transistors in the same way as the mid-point of its input winding 24 is connected to the emitters of the two transistors.)

The features and principles underlying the invention

I claim:

1. In a charging apparatus for a charged load device such as a capacitance having two opposite-polarity load leads through which is to be maintained charged with a direct-current charge at a selected direct-current charge level with energy supplied by an electric direct-current supply source; a transistor amplifier comprising a transistor having a common electrode, an input electrode and an output electrode; an input circuit having an input impedance connected between said common electrode and said input electrode; and an output transformer having a magnetic core and primary and secondary windings interlinked with said core; said primary windings being connected between said common electrode and said output electrode; circuit means for serially connecting said supply source between said common electrode and said primary windings for supplying direct-current to the transistor circuits; and a feedback circuit including said secondary windings, junction rectifier means and said opposite-polarity load leads and being connected across at least a part of said input impedance for feeding back amplified signals from said secondary windings to said input circuit and thereby maintaining sustained oscillations in said transistor circuits and for supplying rectified oscillation charges from said secondary windings to said load leads; said secondary windings having at least one conductive connection to said input electrode; said feedback circuit being responsive to flow of rectified oscillation charges from said secondary winding to said load leads for maintaining said sustained oscillations while rectified charges flow through said load leads and to stop said sustained oscillations in response to rectified charges ceasing to flow through said load leads upon the voltage between said load leads reaching a selected voltage level.

2. In a charging apparatus for a charged load device such as a capacitance having two opposite-polarity load leads through which is to be maintained charged with a direct-current charge at a selected direct-current charge level with energy supplied by an electric direct-current supply source; a transistor amplifier comprising a transistor having a common electrode, an input electrode and an output electrode; an input circuit having an input impedance connected between said common electrode and said input electrode; and an output transformer having a magnetic core and primary and secondary windings interlinked with said core; said primary windings being connected between said common electrode and said output electrode; circuit means for serially connecting said supply source between said common electrode and said primary windings for supplying direct-current to the transistor circuits; and a feedback circuit including said secondary windings, junction rectifier means and said opposite-polarity load leads and being connected across at least a part of said input impedance for feeding back amplified signals from said secondary windings to said input circuit and thereby maintaining sustained oscillations in said transistor circuits and for supplying rectified oscillation charges from said secondary windings to said load leads; said secondary windings having at least one conductive connection to said input electrode; said feedback circuit being responsive to flow of rectified oscillation charges from said secondary winding to said load leads for maintaining said sustained oscillations while rectified charges flow through said load leads and to stop said sustained oscillations in response to rectified charges ceasing to flow through said load leads upon the voltage between said load leads reaching a selected voltage level, said input impedance comprising input windings and a magnetic core structure interlinked with said windings; a storage capacitance connected to said load leads; a photoflash tube having two electrodes connected across said storage capacitance; a flash circuit including further transformer windings interlinked with said core structure and said input windings and connected between an electrode of said flash tube and said input circuit for causing said flash tube to abruptly discharge said storage capacitance and produce a flash in response to a trigger voltage induced in said further transformer windings; a further circuit including a trigger capacitance connected between said rectifier means and said input windings for charging said trigger capacitance with rectified oscillations in said transistor amplifier; and a trigger circuit including selectively actuable switch means for selectively discharging said trigger capacitance through said input windings and thereby induce a trigger voltage in said flash circuit.

3. In an apparatus as claimed in claim 2, a pulsing circuit including a further capacitance and a discharge device connected across at least a part of said input impedance for discharging said further capacitance through said discharge device and at least a part of said input impedance in response to a rise of the direct-current voltage across said further capacitance above a threshold voltage of said discharge device, and a supplemental feedback connection from said output leads to said pulse circuit for supplying rectified charges from said load leads to said further capacitance and causing it to periodically discharge its charges through said discharge device and thereby cause said transistor amplifier to initiate said sustained oscillations in response to the voltage level of said load leads dropping below a selected level.

4. In an apparatus as claimed in claim 3, said discharge device being substantially non-conductive at applied voltages lower than said threshold voltage and permitting passage of current at applied voltages higher than said threshold voltage.

5. In an apparatus as claimed in claim 1, a pulsing circuit including a further capacitance and a discharge device connected across at least a part of said input impedance for discharging said further capacitance through said discharge device and at least a part of said input impedance in response to a rise of the direct-current voltage across said further capacitance above a threshold voltage of said discharge device, and a supplemental feedback connection from said output leads to said pulse circuit for supplying rectified charges from said load leads to said further capacitance and causing it to periodically discharge its charges through said discharge device and thereby cause said transistor amplifier to initiate said sustained oscillations in response to the voltage level of said load leads dropping below a selected level.

References Cited in the file of this patent

UNITED STATES PATENTS

| | | |
|---|---|---|
| 2,748,274 | Pearlman | May 29, 1956 |
| 2,852,730 | Magnuski | Sept. 16, 1958 |
| 2,873,409 | Most | Feb. 10, 1959 |
| 2,877,385 | Rock | Mar. 10, 1959 |
| 2,944,191 | Kapteyn | July 5, 1960 |
| 3,001,125 | Jensen | Sept. 19, 1961 |